United States Patent [19]
Bergman, Jr. et al.

[11] 3,982,136
[45] Sept. 21, 1976

[54] TERNARY FERROELECTRIC FLUORIDE NONLINEAR DEVICES

[75] Inventors: John George Bergman, Jr., Rumson; Glen Robert Crane, Scotch Plains; Howard Joseph Guggenheim, Somerville, all of N.J.

[73] Assignee: Bell Telephone Laboratories, Incorporated, Murray Hill, N.J.

[22] Filed: July 23, 1975

[21] Appl. No.: 598,187

[52] U.S. Cl. .............................. 307/88.3; 321/69 R
[51] Int. Cl.$^2$ ......................................... H02M 5/04
[58] Field of Search .................. 307/88.3; 321/69 R

[56] References Cited
UNITED STATES PATENTS

| | | | |
|---|---|---|---|
| 3,234,475 | 2/1966 | Giordmaine et al. | 330/4.6 |
| 3,262,058 | 7/1966 | Ballman et al. | 330/4.5 |

OTHER PUBLICATIONS

Franken et al., "Physical Review Letters," Aug. 15, 1961, pp. 118–119.

Eibschutz et al., "Solid State Communications," Oct., 1968, pp. 737–739.

Eibschutz et al., "Physics Letters," June 16, 1969, pp. 409–410.

Recker et al., "Journal of Crystal Growth," vol. 26, Nov., 1974, pp. 97–100.

*Primary Examiner*—R. V. Rolinec
*Assistant Examiner*—Darwin R. Hostetter
*Attorney, Agent, or Firm*—P. V. D. Wilde

[57] ABSTRACT

The nonlinear properties of the ternary ferroelectric barium fluorides permit noncritical phase matching in the vicinity of 1.06 microns at room temperature. The crystals can tolerate powers of up to approximatey $10^9$ watts/cm$^2$ and may be used as the essential element in second harmonic generators. These devices operate at room temperature without any need for sophisticated temperature control.

4 Claims, 2 Drawing Figures

TERNARY FERROELECTRIC FLUORIDE NONLINEAR DEVICES

BACKGROUND OF THE INVENTION

1. Field of the Invention

This invention is concerned with the use of nonlinear devices for the conversion of infrared frequencies to higher or lower values. Such devices include but are not limited to second harmonic generators and parametric amplifiers. The invention lies in the discovery that the ternary ferroelectric fluorides, represented by the formula $BaXF_4$ where X is a divalent transition metal ion, will frequency double 1.06 microns at room temperature and under noncritically phase-matched conditions. The preferred noncritically phase-matched condition is relatively insensitive to normally encountered ambient temperature variations. Consequently these materials can be noncritically phase matched at 1.06 microns without the support of sophisticated thermal equipment.

2. Description of the Prior Art

The initial application of optical, infrared and ultraviolet lasers to both research and applied projects was severely limited by the relatively limited number of frequencies at which these devices operated. The first major advance in enlarging this scope of operation involved the use of nonlinear devices. Such devices are able to convert a given frequency to one of higher value, or two frequencies to their sum or difference value. While significantly broadening the scope of laser operation, even this extension left the vast majority of the optical spectrum neglected, from the point of view of available laser operation. The next major advance, the development of the dye laser, essentially filled this void. The entire visible region of the spectrum, and large portions of the infrared and ultraviolet regions are now accessible through the use of dye lasers. However, despite the dye laser, the tenure of the nonlinear devices has not been eclipsed. A number of unique attributes account for their longevity. Firstly, the nonlinear devices are, operationally, simpler than dye lasers and hence more able to withstand the rigors of applied technology. Secondly, in many regions of the spectrum they are more efficient than the dye systems. Thirdly, and of greatest interest in lght of the invention described below, certain near infrared lasers can be miniaturized ans still emit at relatively high power levels. Under these circumstances they are more desirable than the larger and more power-limited dye lasers. The utility of such lasers would, of course, be increased if second harmonic generation would be available to transform this light into the visible.

Among the most readily avialable infrared lasers there are a significant number that emit at 1.06 microns, and hence considerable interest has centered around second harmonic generators which operate at this wavelength. While a number of materials have been discovered which can perform this function, they must be operated at elevated temperature and under strict temperature control in order to realize the full potential available only with noncritical phase-matched conditions. In addition, the susceptibility of some of these materials to radiation damage severely limits their useful power range. The materials described in this specification are the first which are capable of doubling 1.06 microns under the preferred noncritical phase-matched conditions at room temperature and without significant temperature control. In addition, this material can tolerate higher power levels than presently available frequency doublers which operate at 1.06 microns. The discovery of these characteristics enhances the value of available miniature light sources which emit 1.06 microns by enabling the transformation of their output to 0.53 micron yielding a minature light source in the visible.

The description of nonlinear processes may be considerably simplified by using second harmonic generation, perhaps the most elementary of nonlinear phenomena, as a primary example, and as a vehicle to discuss the prior art. The discovery, and first demonstration of second harmonic generation, was made in 1961 by Franken et al. and is described in Volume 7 of the *Physical Review Letters* at page 118. Franken focused the 6943 Angstrom light beam of a ruby laser onto a quartz crystal and found that one part in $10^8$ of this light was converted to second harmonic light with a wavelength of 3471.5 Angstroms. This is exactly half the wavelength and hence twice the energy of the incident light. The basis for this phenomenon can be most readily understood by considering the response properties of a nonlinear material such as quartz. The response of the electrons in such a material to the incident light depends upon the direction of the electromagnetic field associated with this light. The electrons in a nonlinear material are more amenable to motion in one direction than in an other. Thus the electrons move asymmetrically in response to the highly intense incident light and their motion may be represented by a harmonic wave asymmetric about the zero level. Such a dynamic response may be effectively shown to be equivalent to the sum of two simple harmonic motions, one at the incident frequency and one at twice the incident frequency, and a constant nonzero bias value. Second harmonic generation originates with the generation of light associated with the motion which is at twice the frequency of the incident light.

The production efficiency of the frequency-doubled light is severely limited, however, because of the natural dispersion of the nonlinear material. As in all materials, the velocity of light in the medium depends on the frequency of the light and varies inversely with it. As a result of this dispersion, the frequency-doubled light travels more slowly in the medium than the incident light. The incident light travels through the medium at its more rapid speed causing the generation of additional frequency-doubled light as it goes. The previously produced frequency-doubled light may find that by the time it reaches the site of newly generated light it is out of phase with it. The two waves, when they are thusly out of step, are said to be mismatched with respect to phase and destructively interfere with each other. The amount of frequency-doubled light emitted by the crystal is then significantlly diminished.

As a result of the phase mismatch problem, the application of nonlinear phenomena to practical devices was impeded until a critical discovery by Giordmaine and Kleinman (U.S. Pat. No. 3,234,475). They realized that the birefringent properties of certain nonlinear materials might be used to compensate for the dispersive effect and thereby alleviate the phase mismatch. In a birefringent material, light of a given frequency and vector wave number will travel in two different modes. The polarization of these two modes will be orthogonal to each other and their velocities will be different. In a negative uniaxial crystal, the velocity of one of these modes, the extraordinary ray, will be greater than that of the other mode, the ordinary ray. If the incident light is in the ordinary ray mode and the frequency-doubled light is in the extraordinary mode, then the two velocity affecting phenomena come into play. Dispersion tends to lower the velocity of the frequency-doubled light relative to the incident light while birefringence tends to have the opposite effect. Since the magnitude of the birefringence depends on the angle of incidence between the incident light and the optic axis of the crystal, it is conceivable that an angle can be chosen for which the birefringence is of exactly the right magnitude to cancel the effect of dispersion. Under such conditions phase matching is said to exist and the production efficiency of frequency-doubled light rises by orders of magnitude. Angle tuning the birefringence, as just described, has one severe drawback. Unless the angle of incidence is 90°, that for which maximum birefringence occurs, a refractive phenomenon known as walkoff occurs with a resultant loss of efficiency. It is clear then that noncritical phase matching, which describes a phase-matched condition with incident angle of 90°, is most desirable. However, it is also clear that the phase-matching condition will not necessarily be met at a 90° angle of incidence.

In a patent issued in 1966 to Ballman, Boyd, and Miller (U.S. Pat. No. 3,262,658) another technique for controlling the birefringence was disclosed, thereby allowing a preset 90° angle of incidence. These inventors disclosed that the birefringence-dispersion relationship can be controlled by temperature variation. Noncritical phase-matched conditions could then be attained by operating at the proper temperature. Such a material can be operated under noncritically phase-matched conditions at any given frequency over a wide region of the spectrum by merely setting the temperature accordingly. However, the very attribute that allows for temperature tuning dictates careful temperature control. Small temperature variations will detune the crystal from the desired operating conditions. When a given frequency is to be used extensively, the most desirable material would be one that, in addition to being noncritically phase matched at room temperature for the desired frequency, is insensitive to temperature variation. The ternary ferroelectric fluorides described in this specification have these qualities when operated at 1.06 microns.

Despite the fact that 15 years have elapsed since the first demonstration of second harmonic generation, the number of effective and efficient nonlinear materials remains relatively limited. The most widely used of these materials take advantage of the temperature tuning technique. So, for example, the 1.06 micron line of the common glass lasers can be frequency doubled to 0.53 micron using $LiNbO_3$, $BA_2Na(NbO_3)_5$, ADP or KDP. However all of these materials require elevated temperatures to operate under the more efficient noncritical phase-matched condition at this wavelength. In addition, in these materials the noncritically phase-matched condition is extremely sensitive to variations in the applied temperature. Elaborate temperature equipment is then necessary to both elevate the material to the proper temperature and to maintain it at this temperature without even small temperature variations. Unlike these materials, the materials disclosed in this application have been found to be noncritical phase matchable at 1.06 microns under room temperature conditions. In addition it has been found that this noncritical phase matching at room temperature is essentially insensitive to temperature variations normally encountered in ambient environments. The ternary ferroelectric fluorides described in this application are the first materials that have been found to display these characteristics. Because of the proliferation of small solid-state lasers which emit at 1.06 microns a material with these characteristics has been long sought. Its discovery enhances the value of all such infrared lasers.

Other considerations in evaluating a material for use in a nonlinear device, which are not central but nonetheless important, include (a) maximum allowable power levels of the incident radiation, (b) degree of nonlinearity, and (c) material stability under conditions of use.

While the above discussion has been in terms of second harmonic generation, it is clear that there are a host of other nonlinear phenomena to which a viable material might be applied. Such other devices, which might be utilized through the practice of the present invention, include parametric amplification, oscillation, mixing, etc. The operation of such devices is thoroughly understood to those skilled in the art.

SUMMARY OF THE INVENTION

Applicants have discovered that ternary ferroelectric fluorides $BaXF_4$, where X is a divalent transition metal ion, are possessed of characteristics that make them highly useful in nonlinear devices. At the present they are the only materials that are known to be noncritically phase matchable at 1.06 microns under room temperature conditions. In addition they are relatively insensitive to normal temperature variations encountered in ambient environments. In experiments on radiation damage it was found that these materials can withstand power levels of $10_9$ watts/cm$^2$ when presented in the form of 100 nsec. pulses at the rate of 100 pulses/sec. The crystals are of the space group $Cmc2_1$ and may be grown by the Bridgeman technique under conditions well known to those skilled in the crystal growing art.

DETAILED DESCRIPTION

In the course of a search for new nonlinear materials, applicants performed an extensive study of the linear and nonlinear properties of $BaMgF_4$ and $BaZnF_4$. Three quantities must be measured to evaluate the applicability of such materials in nonlinear devices. The first is the index of refraction of both the ordinary and extraordinary waves. If the birefringence is to be effective in eliminating the destructive interference of the induced wave within the crystal, then it must be sufficiently large so as to compensate for the dispersion difference between the original and induced frequencies. This requirement may be expressed by the formula:

$$n^o_\omega \geq n^e_\omega \quad (1)$$

Figure 1:
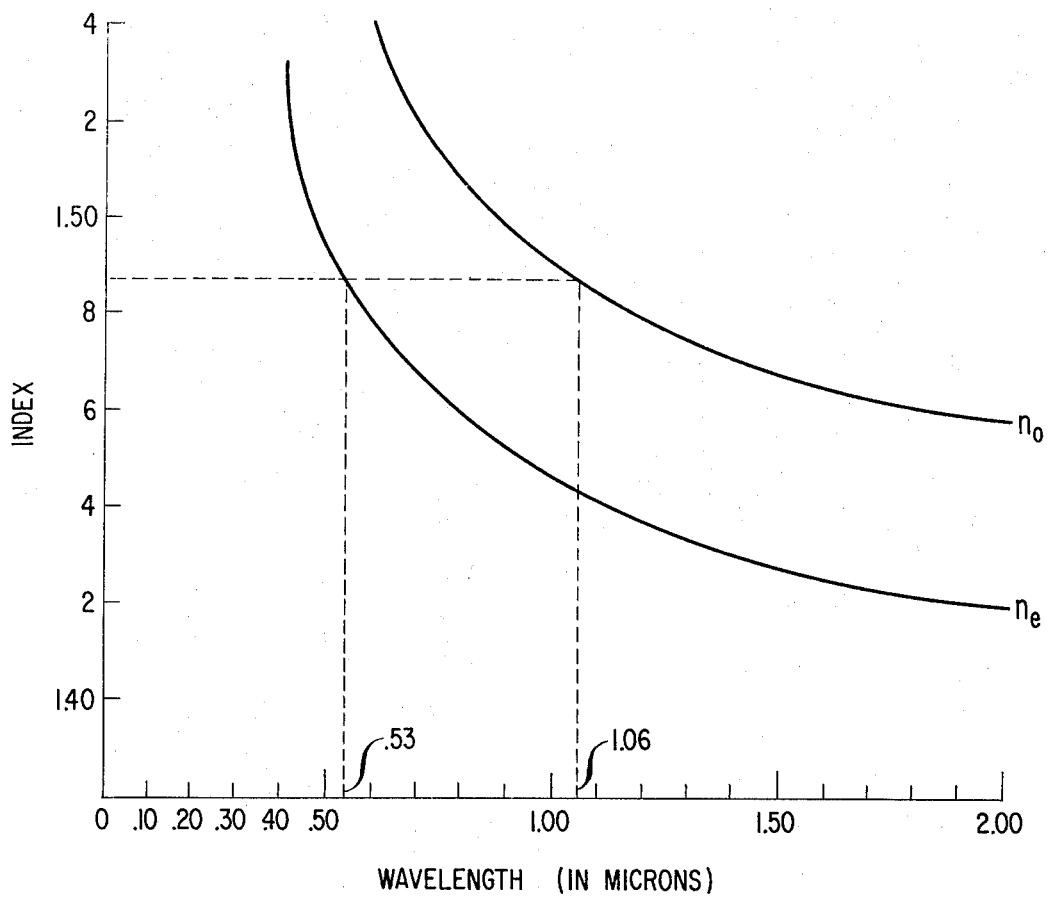
FIG. 1 is a schematic plot of the observed index of refraction for the ternary ferroelectric fluorides described in this application. The index of refraction is plotted on the ordinate and the wavelength in microns on the abscissa.

Here $n$ is the index of refraction, $o$ and $e$ refer to the ordinary and extraordinary rays, respectively, and $\omega$ and $2\omega$ are any given frequency and its harmonic. The indices of refraction for $BaMgF_4$ and $BaZnF_4$ were measured by cutting the crystal into thin wedges with wedge angle less than 5° and utilizing the well-known minimum deviation technique. FIG. 1 is a schematic representation of the results of these measurements, made throughout the visible and infrared for both the ordinary and extraordinary rays. It is clear that the phase-matching condition as expressed in Equation (1) may be obtained for incident radiation of wavelength greater than or equal to approximately 1.06 microns.

The other quantities of interest in nonlinear materials are the coherence length and the relevant nonlinear coefficients. The coherence length is that length through the crystal whose traversal will cause a transmitted wave to be 180° out of phase with a newly generated wave. The nonlinear coefficients are related to the efficiency of second harmonic light production within the crystal. The coherence lengths and the nonlinear coefficients were measured using the same 5° wedges mentioned above. A Q-switched Nd-doped YAG laser emitting at 1.06 microns was used to irradiate the wedge and the second harmonic signal was observed. Translation along the wedge direction gives alternating maxima and minima. The length between maxima is a measure of the coherence length.

Adjusting the wedge for emission of the second harmonic peak allows for the measurement of the nonlinear coefficient. The components of the vector nonlinear polarization $\overline{P}$ at the second harmonic frequency may be given in terms of $\overline{E}$, the electric field associated with the impinging light and the tensor of nonlinear coefficients $d$, i.e., $$\overline{P} = \underline{d}\,\overline{E}^2 \quad (2)$$

Various symmetry arguments may be used to simplify this expression, and for the case of a crystal of Cmc2 symmetry, such as $BaMgF_4$ and $BaZnF_4$, $$P_x = d_{15}E_xE_z, \quad (3a)$$
$$P_y = d_{24}E_yE_z, \quad (3b)$$
$$P_z = d_{31}E_x^2 + d_{32}E_y^2 + d_{33}E_z^2. \quad (3c)$$

A further relation among the coefficients, according to the Kleinman symmetry condition, is $$d_{15} = d_{31}, \quad d_{32} = d_{24} \quad (4)$$

According to Equation (3c) polarizing the impinging light along the $x$, $y$ and then the $z$ directions gives $d_{31}$, $d_{32}$ and $d_{33}$, respectively. According to Equation (3a) polarizing the impinging light in the x-z plane but intermediate between the $x$ and $z$ direction permits the measurement of $d_{15}$. In addition to these measurements, it was determined that the birefringence properties of $BaMgF_4$ and $BaZnF_4$ are essentially insensitive to normal temperature variations encountered in an optics laboratory. No optical damage was observed when a focused 1.06 micron fundamental of intensity of approximately $10^9$ watts/cm$^2$ was incident on the crystal, in the form of 100 nsec. pulses at the rate of 100 pulses/sec. This may be compared, for example, with $LiNbO_3$ which displays significant radiation damage when exposed to power levels of $10^6$ watts/cm$^2$, under similar irradiation.

Table I is a tabulation of the observed coherence lengths and nonlinear coefficients $BaMgF_4$ and $BaZnF_4$.

TABLE I

Observed Nonlinear Coefficients (d's) and Coherence Lengths (l's) for $BaMgF_4$ and $BaZnF_4$.*

|  | $BaMgF_4$ | $BaZnF_4$ |
|---|---|---|
| $d_{33}$ | 0.05 | 0.11 |
| $d_{31}$ | 0.07 | 0.025 |
| $d_{15}$ | 0.07 | 0.033 |
| $d_{32}$ | 0.13 | 0.25 |
| $d_{24}$ | 0.07 | — |
| $l_{33}$ | 29.3 | 28.0 |
| $l_{31}$ | — | 112 |
| $l_{15}$ | 23.3 | 20.2 |
| $l_{32}$ | 9.6 | 9.82 |
| $l_{24}$ | 170.0 | — |

*Nonlinear coefficients (d's) are given relative to $d_{11}$ ($SiO_2$) ±20%; coherence lengths (l's) are given in microns for $\omega = 1.06\mu$, $2\omega = 0.53\mu$; the relative signs ($BaZnF_4$: $d_{33}d_{31} < 0$, $d_{33}d_{32} > 0$; and $BaMgF_4$: $d_{33}d_{32} > 0$) were determined by interference techniques.

In evaluating the constants displayed in Table I it is important to bear in mind that the resistance of the ternary barium fluorides to radiation damage plays an important role in enhancing their utility. Because these materials are ionic in nature, they can withstand power levels which in other materials would result in significant radiation damage. As a result, the relatively small nonlinear coefficients associated with the ternary ferroelectric fluorides can be more than compensated by greater input powers. The result of this coupling of larger input powers with an admittedly small nonlinear coefficient is a net gain in realizable ouput power. The input powers necessary to realize this gain are readily available from present day glass lasers.

Figure 2:
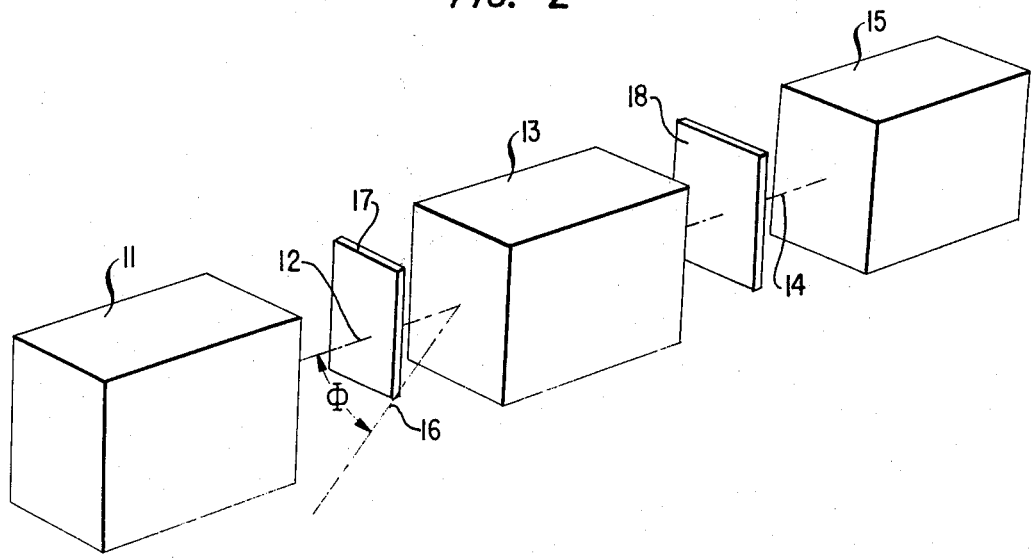
FIG. 2 is a schematic representation of a nonlinear device using a ternary ferroelectric fluoride as the active element.

FIG. 2 is a schematic of the nonlinear device using $BaMgF_4$ or $BaZnF_4$ as the active element. In this Figure, 11 is a source of coherent radiation, 12, and will be a laser in most cases. The light generated by the nonlinear device, 14, is detected at 15. This impinging beam is shown entering the crystal, 13, at an angle $\Phi$ relative to 16, the optic axis of the crystal. Any optics necessary to properly focus the light on 13 is included in 11. Likewise, 15 may include any optics necessary to efficiently collect the emitted light 14, and may include a narrow band filter. In certain applications, the device may be operated with a resonant means in order to support a standing wave of one of the frequencies in the crystalline body. In such an event, 17 and 18, shown in the FIG. 2, would represent an appropriate resonant means, such as partially reflecting mirrors, necessary to support the standing wavelength.

In the preferred embodiment, the emitted light 14 is the second harmonic of the impinging light 12. Under these circumstances, 12 may be any wavelength greater than or equal to approximately 1.06 microns although the fullest advantage is derived from this invention when 12 is about $1.06 \pm 0.1$ microns.

The device of FIG. 2 might also be used as a mixer or a parametric oscillator. In such a case, 12 would be the two input frequencies and 14 would be the output beam.

While the experimental work has involved only $BaMgF_4$ and $BaZnF_4$, similar results should appear with other ternary ferroelectric fluorides. Specifically, the compound $BaXF_4$, where X is a divalent transition metal ion and the resultant crystal is isomorphous with $BaMgF_4$ and $BaZnF_4$, should exhibit nonlinear properties similar to those reported here. This similarity is expected since the electronic structure of the crystal, which yields the nonlinear properties, is comparable in all of the compounds. Although the size of the transition metal ion class varies, depending on the specific notation being followed, those elements suitable for substitution in the above compound include Zn, Ni, Co, Fe, Mn, and Mg. Slight variations in the electrical substructure of these elements may have some small effect on the nonlinear properties of the $BaXF_4$ crystal, but not large enough to substantially change from the overall properties observed. Likewise, the element X may include mixtures of the above elements with little substantial change in the nonlinear properties.

The invention then comprises a nonlinear device with a ternary ferroelectric barium fluoride as the active element. The preferred embodiment involves second harmonic generation, i.e., 0.53 micron from a 1.06 micron fundamental. Alternatively, the device may be used to frequency double any wavelength above 1.06 microns under critically phase-matched conditions, though the useful upper limit is about 8 microns where absorption occurs.

What is claimed is:

1. A device comprising a crystalline body consisting essentially of the compound $BaXF_4$, where X is a divalent transition metal ion, collected from the group consisting of Zn, Ni, Co, Fe, Mn and Mg or mixtures thereof, with means for introducing into said crystalline body a beam of coherent plane polarized electromagnetic radiation at 1.06 ± 0.1 microns and means for extracting a beam of coherent electromagnetic radiation at 0.53 ± 0.05 micron emitted from said body, the said body being positioned in such a way that the angle between the beam of first frequency and the optic axis of said crystalline body is such that the first beam and second beam are noncritically phase matched within the crystal.

2. The device of claim 1 where the compound is selected from the group consisting of $BaMgF_4$ and $BaZnF_4$.

3. The device of claim 1 where the means for extracting the radiation includes a narrow band filter.

4. The device of claim 2 together with a resonant means of supporting a standing wave of one of said frequencies in said crystalline body.

* * * * *